(12) United States Patent
Saito

(10) Patent No.: US 8,165,532 B2
(45) Date of Patent: Apr. 24, 2012

(54) WIRELESS COMMUNICATION APPARATUS AND METHOD OF CONTROLLING THE SAME

(75) Inventor: Katsuo Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 12/406,794

(22) Filed: Mar. 18, 2009

(65) Prior Publication Data
US 2009/0247093 A1 Oct. 1, 2009

(30) Foreign Application Priority Data
Apr. 1, 2008 (JP) ................. 2008-095431

(51) Int. Cl.
*H04B 1/00* (2006.01)
*H04B 7/00* (2006.01)
(52) U.S. Cl. ........... 455/69; 465/101; 465/102; 465/103
(58) Field of Classification Search .................. None
See application file for complete search history.

(56) References Cited

U.S. PATENT DOCUMENTS

| 6,289,036 | B1 | 9/2001 | Saito et al. ............ 375/130 |
| 6,701,129 | B1 * | 3/2004 | Hashem et al. ......... 455/67.11 |
| 6,985,752 | B2 * | 1/2006 | Takano et al. ............ 455/522 |
| 7,486,634 | B2 * | 2/2009 | Itoh ........................ 370/318 |
| 7,502,350 | B2 * | 3/2009 | Sugita ................... 370/337 |
| 7,636,551 | B2 * | 12/2009 | Ue et al. ................. 455/63.1 |
| 2001/0014612 | A1 * | 8/2001 | Uesugi .................. 455/522 |
| 2002/0077064 | A1 * | 6/2002 | Ue et al. ................. 455/69 |
| 2004/0137867 | A1 * | 7/2004 | Moon et al. ............ 455/226.1 |

* cited by examiner

*Primary Examiner* — Tuan T Lam
(74) *Attorney, Agent, or Firm* — Fitzpatrick, Cella, Harper & Scinto

(57) ABSTRACT

A wireless communication apparatus for performing wireless communication by selectively switching among a plurality of transmission schemes having different transmission performance capabilities is provided. A detection unit detects reception quality of a signal, and a changeover unit changes over the transmission scheme in accordance with the reception quality detected. A control unit performs control for changing a threshold value, which is for changing over the transmission scheme, in accordance with a fluctuation in the reception quality.

6 Claims, 10 Drawing Sheets

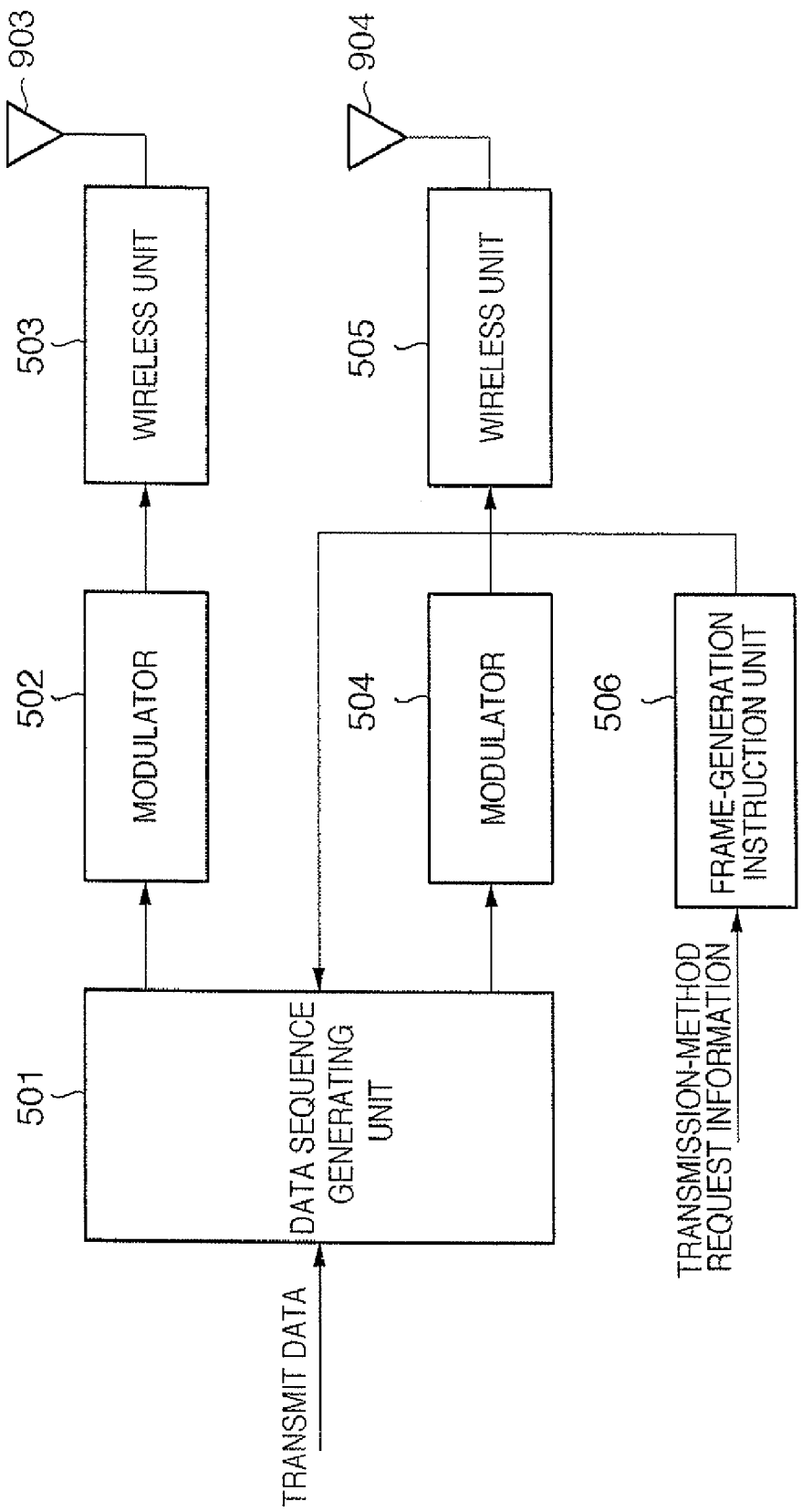
FIG. 5   FUNDAMENTAL CONFIGURATION OF TRANSMITTER ACCORDING TO PRIOR ART

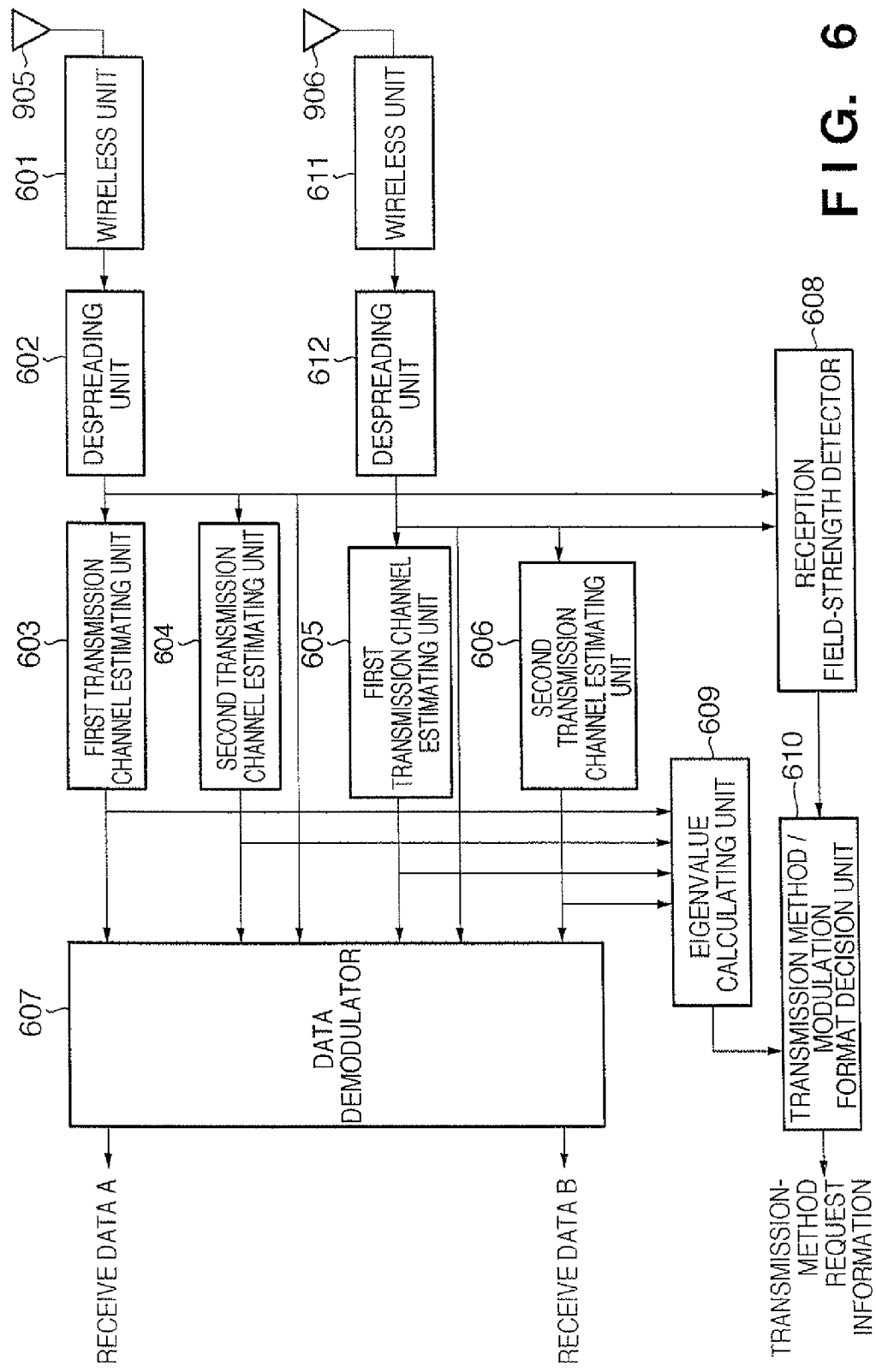

FUNDAMENTAL CONFIGURATION OF COMMUNICATION SYSTEM USING PLURALITY OF ANTENNAS

F I G. 10

| MODULATION SCHEME | QPSK | 16QAM | 64QAM |
|---|---|---|---|
| SNR THRESHOLD VALUE | SNR(QPSK) | SNR(QAM) | SNR(16QAM) |

WIRELESS COMMUNICATION APPARATUS AND METHOD OF CONTROLLING THE SAME

BACKGROUND OF THE INVENTION

1. Field of the Invention

The present invention relates to a wireless communication technique. More particularly, the invention relates to wireless communication that utilizes an STBC (Space-Time Block Coding) transmission scheme and a non-STBC transmission scheme, etc.

2. Description of the Related Art

Conventionally, wireless LAN systems use an ISM band such as IEEE 802.11b and IEEE 802.11g. This frequency band is one that can be used freely by receiving wireless approval but, for this reason, the number of terminals used increases and this leads to congestion. It is necessary to raise the efficiency of frequency utilization in order to broaden the band of the wireless communication system used within this frequency band.

With this as a background, the IEEE 802.11n standard exists for the purpose of broadening the frequency band of a wireless communication system. The IEEE 802.11n standard is optimum for raising the efficiency of frequency utilization. The IEEE 802.11n standard utilizes a MIMO (Multiple Input, Multiple Output) technique, which employs a plurality of transmit antennas and a plurality of receive antennas. Further, the technique referred to as STBC (Space-Time Block Coding) transmission also is utilized. STBC transmission forms MIMO channels and, on the transmit side, subjects a single information signal sequence to space-time coding in the time and space directions and transmits the coded signal sequence from a plurality of transmit antennas in parallel. On the receive side, the STBC transmission scheme performs decoding using a transfer function of each estimated channel. As a result, an effect equivalent to the transmission diversity effect can be obtained.

Since the STBC transmission scheme sends the same transmit data from a plurality of antennas in parallel, the transmission rate is low. However, the receive CNR (carrier-to-noise ratio) can be improved by the transmit diversity effect and highly reliable transmission is possible.

Further, another method of improving frequency utilization efficiency is non-STBC transmission. This scheme similarly forms MIMO channels using a plurality of transmit antennas and a plurality of receive antennas. On the receive side, this scheme decodes transmit signals from each of the transmit antennas using the transfer functions of the MIMO channels estimated from the receive signals of the plurality of receive antennas. This method uses a plurality of transceive antennas, thereby increasing the number of spatially independent transmission channels by the number of transmit antennas. By transmitting items of independent data through each of the transmission channels, the transmission rate is increased.

The non-STBC transmission scheme uses a plurality of antennas and forms a unique stream by executing calibration processing, thereby realizing high-speed wireless communication. Since the unique stream is dependent upon the wireless propagation characteristic, the non-STBC transmission scheme can no longer be maintained and performing high-speed wireless communication becomes difficult if the wireless propagation characteristic changes.

The STBC transmission scheme is one that has an effect equivalent to transmit diversity. It is a highly reliable transmission scheme in which, even with a single antenna on the receive side, a reception characteristic equal to that in a case where reception is performed by two antennas is obtained.

FIG. 9 is a diagram useful in describing the concept of a communication system that uses a plurality of antennas.

In FIG. 9, a base station device 901 has antennas 903 and 904 and communicates via terminal device 902 and wireless link. The terminal device 902 has antennas 905 and 906.

Let h11($t$) and h12($t$) represent the channel transfer function of the transmission channel between the antennas 903 and 905 and the channel transfer function of the transmission channel between the antennas 903 and 906, respectively. Similarly, let h21($t$) and h22($t$) represent the channel transfer function of the transmission channel between the antennas 904 and 905 and the channel transfer function of the transmission channel between the antennas 904 and 906, respectively. The transfer functions h11($t$), h12($t$), h21($t$) and h22($t$) are functions which the terminal device 902 estimates using a propagation environment estimation symbol, such as a pilot signal, transmitted from the base station device 901.

With the STBC transmission scheme, the following equation holds:

$$\begin{pmatrix} R1(i) \\ R1(i+1) \end{pmatrix} = \begin{pmatrix} h11(i) & h21(i) \\ h21*(i+1) & -h11*(i+1) \end{pmatrix} \begin{pmatrix} SyA \\ SyB \end{pmatrix} \quad \text{Equation (1)}$$

where R1($t$) represents the receive signal of antenna 905 in FIG. 9.

As will be understood from this equation, the STBC transmission scheme transmits data symbols SyA and SyB repeatedly at times t=i and t=i+1.

With the non-STBC scheme, on the other hand, the following equation holds:

$$\begin{pmatrix} R1(i) \\ R2(i) \end{pmatrix} = \begin{pmatrix} h11(i) & h12(i) \\ h21(i) & h22(i) \end{pmatrix} \begin{pmatrix} SyA \\ SyB \end{pmatrix} \quad \text{Equation (2)}$$

where R1($t$), R2($t$) represent the receive signals of the antennas 905, 906 shown in FIG. 9.

As will be understood from this equation, the non-STBC transmission scheme transmits data symbols SyA and SyB only at time t=1.

Thus, although the STBC scheme has a transmission rate inferior to that of the non-STBC scheme, it can be said to be better in terms of reception quality. Conversely, although the non-STBC scheme has a higher transmission rate, it is inferior in terms of reception quality.

FIG. 5 is a block diagram illustrating a transmitter in the base station device 901 of a communication system having a plurality of antennas.

In FIG. 5, a frame-generation instruction unit 506 decides the transmission method (STBC scheme or non-STBC scheme) based upon transmission-method request information transmitted from a terminal device 902, and instructs a data sequence generating unit 501 of the decided content by a frame-generating instruction signal S1.

In accordance with the instruction from the frame-generation instruction unit 506, the data sequence generating unit 501 generates a transmit digital signal S2 of a modulating signal A and a transmit digital signal S3 of a modulating signal B from the transmit data.

A modulator 502 is capable of performing modulation using a plurality of modulation schemes and modulates the transmit digital signal S2 of modulating signal A, which has been output from the data sequence generating unit 501, using the modulation scheme of which it has been instructed. The modulated signal is converted to a radio-frequency signal by a wireless unit 503 and the modulated signal is transmitted from antenna 903.

Similarly, a modulator 504 is capable of performing modulation using a plurality of modulation schemes and modulates the transmit digital signal S3 of modulating signal B, which has been output from the data sequence generating unit 501, using the modulation scheme of which it has been instructed. The modulated signal is converted to a radio-frequency signal by a wireless unit 505 and the modulated signal is transmitted from antenna 904.

FIG. 6 is a block diagram illustrating a receiver in the terminal device 902 of the communication system having a plurality of antennas.

In FIG. 6, antenna 905 receives a combined signal that is the result of combining signals transmitted from the antennas 903 and 904 of the base station device 901, and a wireless unit 601 converts this receive signal to a desired frequency and supplies the resultant signal to a despreading unit 602. The latter despreads the receive signal and supplies the despread signal to a first transmission channel estimating unit 603, a second transmission channel estimating unit 604 and a data demodulator 607.

In accordance with a synchronizing signal generated by as frame synchronizer (not shown), the first transmission channel estimating unit 603, using a pilot signal, estimates the transmission channel of modulating signal A in the signal that has been output from the despreading unit 602. The estimated transmission-channel information of modulating signal A is output from the first transmission channel estimating unit 603 to the data demodulator 607 and to an eigenvalue calculating unit 609. The transmission-channel estimation signal of modulating signal A corresponds to $h11(t)$ in Equation (2).

In accordance with a synchronizing signal generated by as frame synchronizer (not shown), the second transmission channel estimating unit 604, using a pilot signal, estimates the transmission channel of modulating signal B in the signal that has been output from the despreading unit 602. The estimated transmission-channel information of modulating signal B is output from the second transmission channel estimating unit 604 to the data demodulator 607 and to an eigenvalue calculating unit 609. The transmission-channel estimation signal of modulating signal B corresponds to $h12(t)$ in Equation (2).

It should be noted that since the wireless signal received by antenna 906 is subjected to similar processing in a wireless unit 611, despreading unit 612, first transmission channel estimating unit 605 and second transmission channel estimating unit 606, this processing need not be described. A transmission-channel estimation signal that is output from the first transmission channel estimating unit 605 to the data demodulator 607 corresponds to $h21(t)$, and a transmission-channel estimation signal that is output from the second transmission channel estimating unit 606 to the data demodulator 607 corresponds to $h22(t)$.

In accordance with a timing signal that has been output from a frame synchronizer (not shown), the data demodulator 607 demodulates the signals, which have been output from the despreading units 602 and 612, using the output signals from the first transmission channel estimating units 603, 605 and the second transmission channel estimating units 604, 606. As a result, the receive digital signal of modulating signal A and the receive digital signal of the modulating signal B are obtained. At this time the data demodulator 607 identifies the signal transmission method (STBC scheme or non-STBC scheme) from transmission-method notification symbols contained in the pilot signals of the signals that have been output from the despreading units 602 and 612 and demodulates the data symbols in accordance with the content of the identification.

A reception field-strength detector 608 detects the reception field strengths based upon the signals that have been output from the despreading units 602, 612 and outputs the results of detection to a transmission method/modulation format decision unit 610.

When the transmission-channel information that has been output from the first transmission channel estimating units 603, 605 and the second transmission channel estimating units 604, 606 have been put into the form of a channel matrix, as indicated by Equation (2), the eigenvalue calculating unit 609 calculates the eigenvalue thereof and outputs the value to the transmission method/modulation format decision unit 610.

On the basis of the eigenvalue signal that has been output from the eigenvalue calculating unit 609 and the detection signal that has been output from the reception field-strength detector 608, the transmission method/modulation format decision unit 610 decides the transmission method and modulation format which the base station device 901 applies at the start of communication. Specifically, the transmission method/modulation format decision unit 610 decides upon either the STBC scheme or non-STBC scheme as the transmission method and decides QPSK, QAM, etc., as the modulation format.

The information decided is transmitted from the terminal device 902 to the base station device 901 as the transmission-method request information, and the base station device 901 performs transmission by the transmission method that is based upon this information.

Conventionally, in such wireless communication that utilizes the STBC scheme and the non-STBC scheme, which of the two transmission schemes should be selected and changed over to is performed based upon the reception field strengths of the receiver, as in the example of the prior art described above.

Further, the selection and changeover is performed also in accordance with quality of service (QoS) and reception SNR (signal-to-noise ratio) of the transmit data and the number of communicating parties.

However, which of the two transmission schemes is suited to high-speed transmission cannot be uniquely decided from reception field strength and reception SNR. One reason for this is that the optimum reception SNR varies greatly depending upon the modulation scheme (number of multiple values) used in communication.

SUMMARY OF THE INVENTION

The present invention seeks to improve control for changing over between a transmission scheme for coding an information signal in the time direction and transmitting the same information signal from a plurality of antennas and a transmission scheme for transmitting independent information signals from a plurality of antennas, thereby achieving both highly reliable transmission and high-speed transmission.

According to one aspect of the present invention, a wireless communication apparatus for performing wireless communication by selectively switching among a plurality of transmission schemes having different transmission performance capabilities is provided. The apparatus includes a detection unit configured to detect reception quality of a signal, a changeover unit configured to change over the transmission scheme in accordance with the reception quality detected, and a control unit configured to perform control for changing a threshold value, which is for changing over the transmission scheme, in accordance with a fluctuation in the reception quality.

Further features of the present invention will become apparent from the following description of exemplary embodiments with reference to the attached drawings.

BRIEF DESCRIPTION OF THE DRAWINGS

FIG. 5 is a block diagram illustrating a transmitter in a base station device of a communication system that uses a plurality of antennas according to the prior art;

FIG. 6 is a block diagram of a receiver in a terminal device of a communication system that uses a plurality of antennas according to the prior art;

FIG. 10 is a diagram illustrating an example of the data structure of a table held in a threshold-value storage unit in an embodiment.

DESCRIPTION OF THE EMBODIMENTS

Preferred embodiments of the present invention will now be described in detail with reference to the drawings. The present invention is not limited to the following embodiments and merely illustrates a specific example advantageous in working the present invention. Further, all combinations of features described in the following embodiments are not necessarily essential as means for solving the problem to which the present invention is directed.

<First Embodiment>

Figure 9:
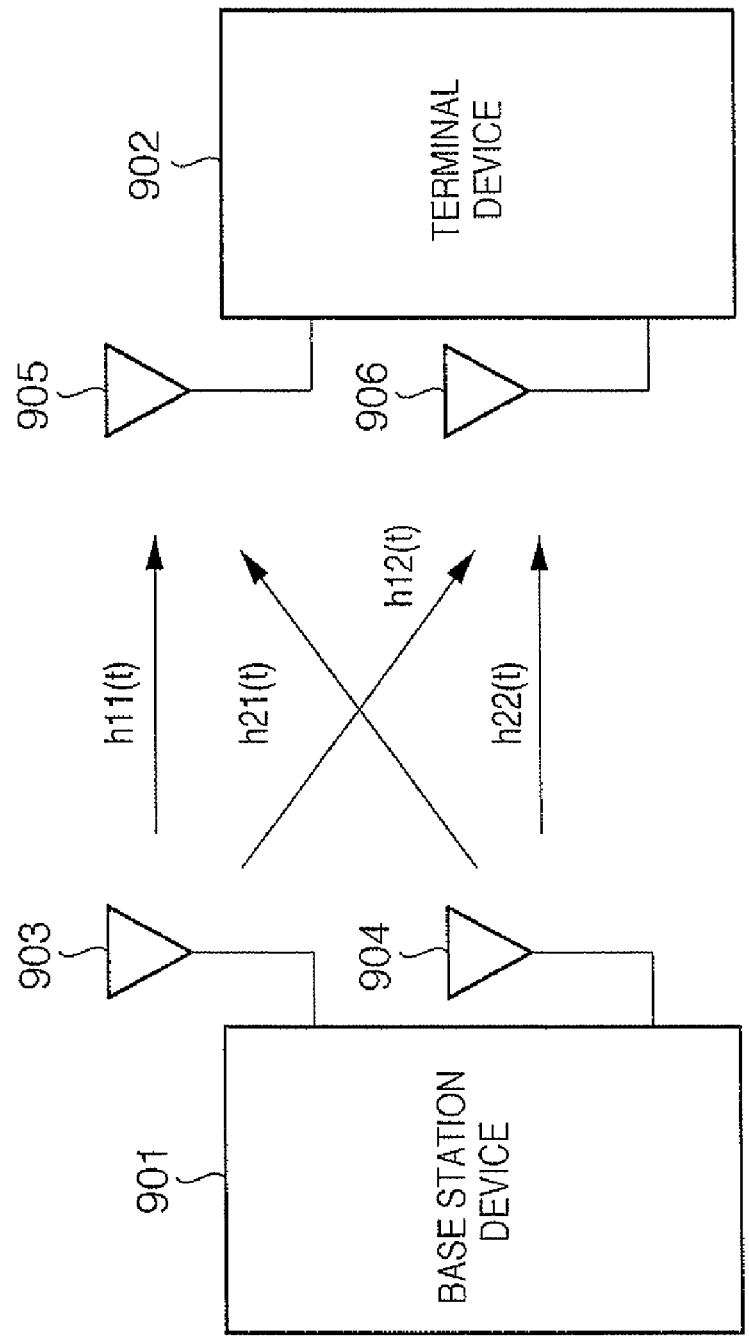
FIG. 9 is a diagram illustrating the configuration of a communication system in which a transmitter and a receiver have a plurality of antennas.

The fundamental configuration of a communication system in which a plurality of antennas are used on each of transmit and receive sides in this embodiment is similar to the configuration shown in FIG. 9 and therefore reference is had to FIG. 9 in this embodiment as well. A wireless communication apparatus in this embodiment is adapted so as to perform wireless communication by changing over selectively between two transmission schemes as transmission methods. The first transmission scheme is an STBC transmission scheme for coding an information signal in the spatial direction and transmitting the same information signal from a plurality of antennas. The second is a non-STBC transmission scheme for transmitting independent information signals from respective ones of a plurality of antennas.

Figure 2:
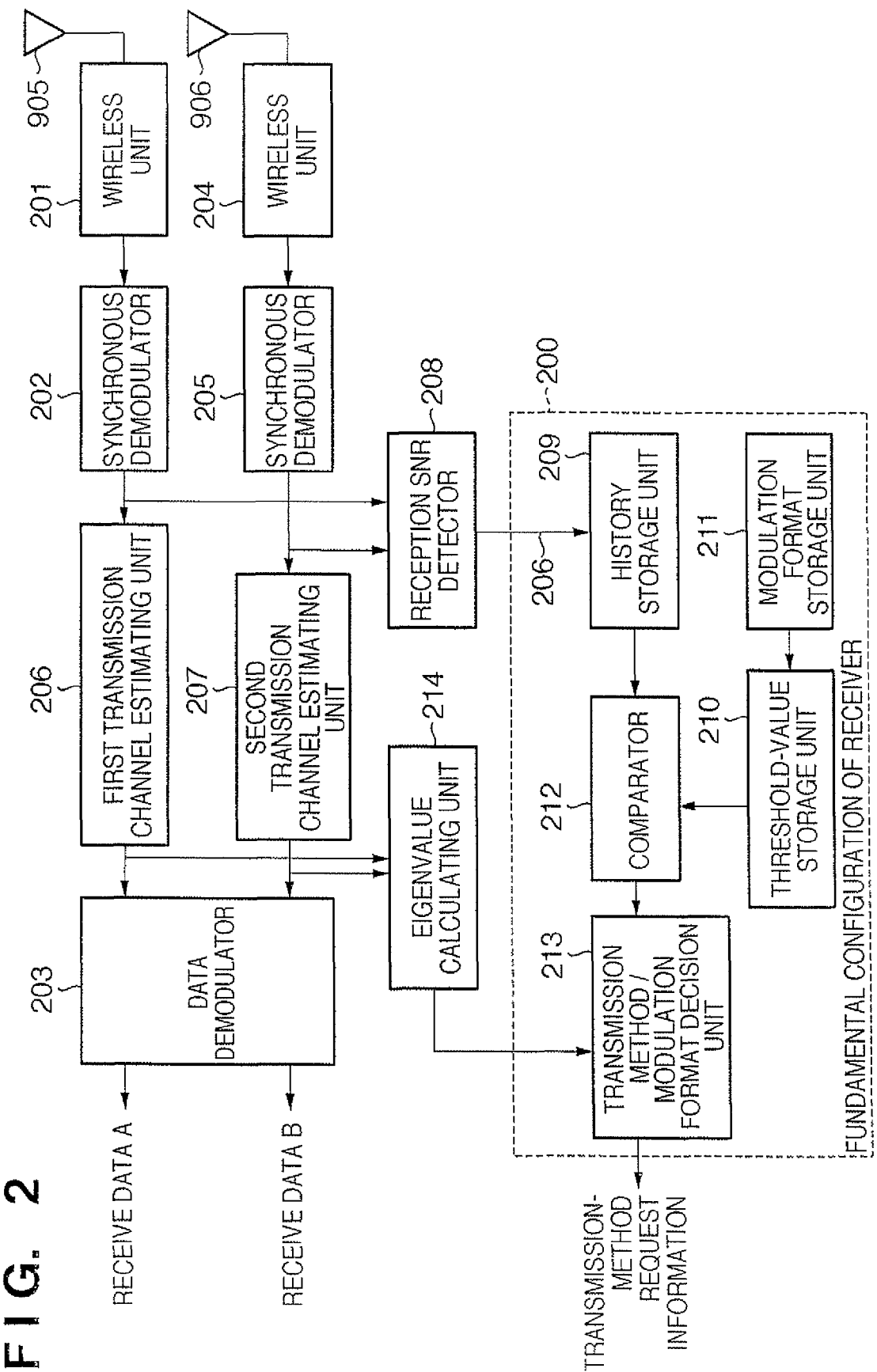
FIG. 2 is a block diagram of a receiver in a terminal device of a communication system that uses a plurality of antennas according to an embodiment.

FIG. 2 is a block diagram of a receiver in a terminal serving as a wireless communication apparatus in a communication system that uses a plurality of antennas according to this embodiment.

In FIG. 2, antenna 905 receives a combined signal that is the result of combining signals transmitted from the antennas 903 and 904 of base station device 901, and a wireless unit 201 converts this receive signal to a desired frequency and supplies the resultant signal to a synchronous demodulator 202. The synchronous demodulator 202 performs synchronous detection using the receive signal and obtains a baseband signal by a synchronizing signal (not shown). The signal obtained is supplied to a data demodulator 203, first transmission channel estimating unit 603 and reception SNR detector 208.

In accordance with a synchronizing signal generated by a frame synchronizer (not shown), the first transmission channel estimating unit 206, using a pilot signal, estimates the transmission channels of modulating signal A and modulating signal B, which are signals that have been output from the synchronous demodulator 202. The estimated transmission-channel information of modulating signal A and modulating signal B is output from the first transmission channel estimating unit 206 to the data demodulator 203 and to an eigenvalue calculating unit 214. The transmission-channel estimation signal of modulating signal A corresponds to $h11(t)$ in Equation (2), and the transmission-channel estimation signal of modulating signal B corresponds to $h12(t)$ in Equation (2).

It should be noted that since the wireless signal received by antenna 906 is subjected to similar processing in a wireless unit 204, synchronous demodulator 205 and second transmission channel estimating unit 207, this processing need not be described. A transmission-channel estimation signal of modulating signal A that is output from the second transmission channel estimating unit 207 to the data demodulator 203 corresponds to $h21(t)$, and a transmission-channel estimation signal of modulating signal B corresponds to $h22(t)$.

In accordance with a timing signal that has been output from a frame synchronizer (not shown), the data demodulator 203 demodulates the signals, which have been output from the synchronous demodulators 202 and 205, using the output signals from the first transmission channel estimating unit 206 and second transmission channel estimating unit 207. As a result, the receive digital signal of modulating signal A and the receive digital signal of the modulating signal B are obtained. At this time the data demodulator 203 identifies the signal transmission method (STBC scheme or non-STBC scheme) from transmission-method notification symbols contained in the pilot signals of the signals that have been output from the synchronous demodulators 202 and 205 and demodulates the data symbols in accordance with the content of the identification.

On the basis of the signals that have been output from the synchronous demodulators 202 and 205, the reception SNR detector 208 periodically detects reception SNR as reception quality and stores the results of detection in a history storage unit 209 within a controller 200.

When the transmission-channel information that has been output from the first transmission channel estimating unit 206 and second transmission channel estimating unit 207 have been put into the form of a channel matrix, as indicated by Equation (2), the eigenvalue calculating unit 214 calculates the eigenvalue thereof and outputs the value to a transmission method/modulation format decision unit 213.

On the basis of the eigenvalue signal that has been output from the eigenvalue calculating unit 214 and the detection signal that has been output from the reception SNR detector 208, the transmission method/modulation format decision unit 213 decides the transmission method which the base station device 901 applies at the start of communication. Specifically, the transmission method/modulation format decision unit 213 decides upon either the STBC scheme or non-STBC scheme as the transmission method The information decided is transmitted from the terminal device 902 to the base station device 901 as the transmission-method request information, and the base station device 901 performs transmission by the transmission method that is based upon this information.

The reception SNR value detected by the reception SNR detector 208 is stored in the history storage unit 209, and thus a fluctuation in the reception SNR value within a fixed period of time is stored.

A threshold-value storage unit 210 is for storing, in the form of a table, the threshold values of reception SNRs that correspond to modulation formats. The threshold value of reception SNR has a threshold value that differs depending upon the modulation scheme. An example of the data structure of this table is shown in FIG. 10. In the example illustrated, threshold values SNR(QPSK), SNR(16QAM) and SNR(64QAM) corresponding to the respective modulation formats QPSK, 16QAM and 64QAM have been written in the table.

A modulation format storage unit 211 stores the modulation format in which communication is currently being performed. A comparator 212 compares the reception SNR values that have been stored in the history storage unit 209 with a certain threshold value, which corresponds to the modulation scheme, stored in the threshold-value storage unit 210. In accordance with the result of the comparison by the comparator 212, the transmission method/modulation format decision unit 213 decides the transmission method and sends the communicating party the transmission-method request information that conforms to the transmission method decided. Accordingly, the threshold value of the reception SNR that has been stored in the threshold-value storage unit 210 indicates a reception SNR value that prevails when throughput in a case where the transmission method is the STBC scheme and throughput in a case where the transmission method is the non-STBC scheme are equal.

Figure 3A:
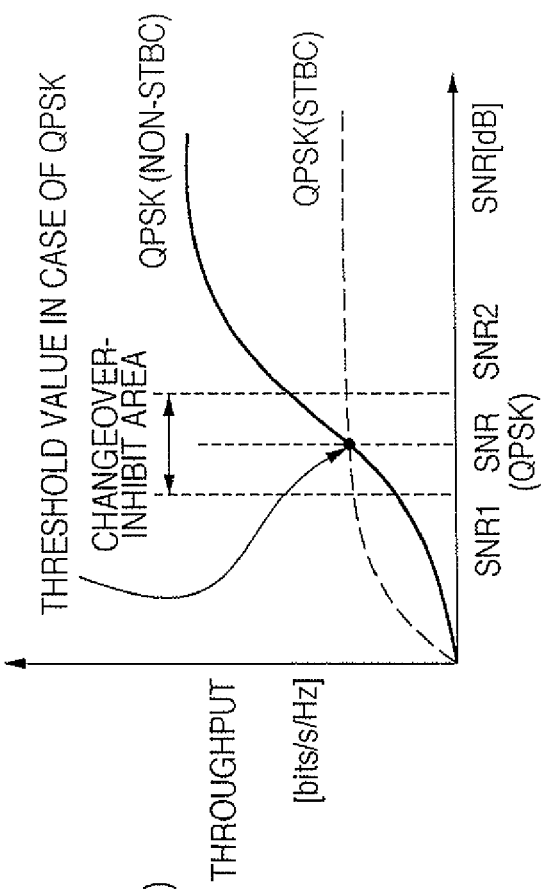
FIGS. 3A and 3B are diagrams illustrating examples of areas in which changeover between STBC and non-STBC schemes is inhibited in a case where the modulation format is QPSK in an embodiment.

FIG. 3A illustrates the relationship between reception SNR and throughput for both the STBC scheme and non-STBC scheme in a case where the modulation format is QPSK.

It will be understood from FIG. 3A that the throughput is high for the STBC scheme in an environment in which the reception SNR value is smaller than the threshold value SNR(QPSK) and the noise level is comparatively high. Conversely, the throughput is higher for the non-STBC scheme in an environment in which the reception SNR value is larger than the threshold value SNR(QPSK) and the noise level is low. That is, FIG. 3A indicates that throughput in an instance where the modulation format is QPSK undergoes a reversal between the case where communication is performed by STBC and the case where communication is performed by non-STBC, with the boundary being the threshold value SNR(QPSK) of the reception SNR value.

Figure 3B:
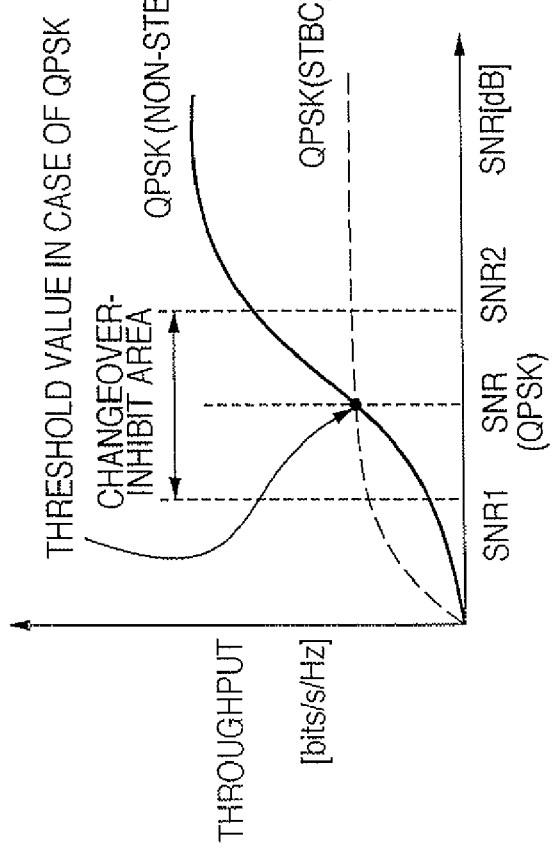

In FIGS. 3A and 3B, a changeover-inhibit area W corresponds to a range of fluctuation, within a fixed period of time, of the reception SNR values that have been stored in the history storage unit 209. Specifically, the changeover-inhibit area W is set as an SNR zone that is equal to the range of fluctuation of the reception SNR values within a fixed period of time or that has a width conforming to this range of fluctuation, with the center of the zone being the threshold value SNR(QPSK).

In FIGS. 3A and 3B, SNR1, SNR2 indicate the minimum and maximum SNR values, respectively, of the changeover-inhibit areas. In a case where the average value of reception SNR values within the fixed period of time that have been stored in the history storage unit 209 falls within the changeover-inhibit area, the transmission method is not changed over and the currently prevailing transmission method is maintained.

When the average value of the reception SNR values is greater than the maximum value SNR2 of the changeover-inhibit area, the transmission method is changed over to the non-STBC scheme. When the average value of the reception SNR values is smaller than the minimum value SNR1 of the changeover-inhibit area, it is determined that the communication environment is poor and therefore the transmission method is changed over to the STBC scheme.

The changeover-inhibit area W changes constantly in accordance with environmental fluctuation during communication, i.e., range of fluctuation of the reception SNR values that have been stored in the history storage unit 209, and the values of SNR1, SNR2 also change in accordance with this range. FIG. 3A represents a case where the fluctuation in reception SNR is large, and FIG. 3B represents a case where the fluctuation in reception SNR is small.

Figure 4A:
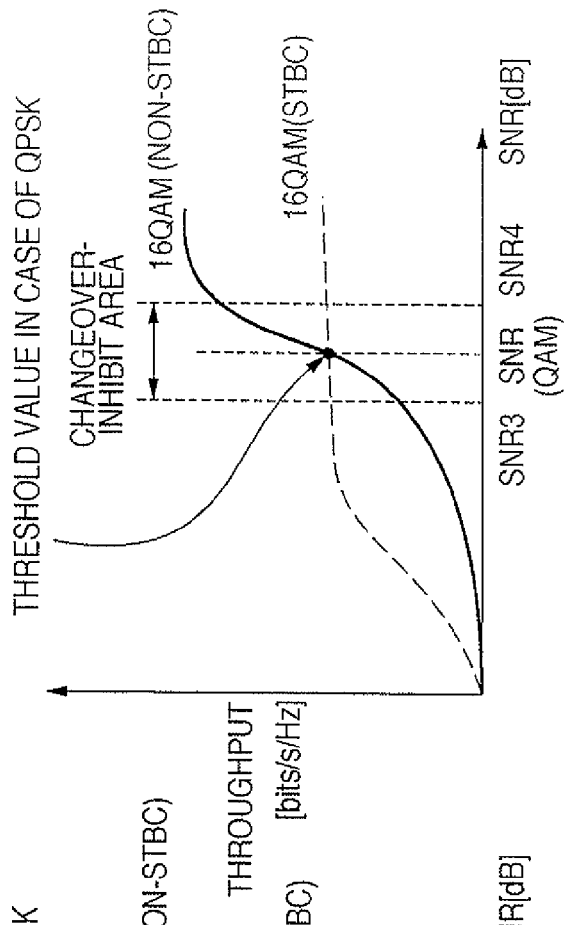
FIGS. 4A and 4B are diagrams illustrating examples of areas in which changeover between STBC and non-STBC schemes is inhibited in a case where the modulation format is 16QAM in an embodiment.

FIG. 4A illustrates the relationship between reception SNR and throughput for both the STBC scheme and non-STBC scheme in a case where the modulation format is 16QAM.

Also in the case where the modulation scheme is 16QAM, a changeover-inhibit area W equal to the range of fluctuation in reception SNR is set about the threshold value SNR(QAM) as center, and minimum and maximum values SNR3, SNR4, respectively, of the changeover-inhibit area W are decided in a manner similar to that of FIG. 3A.

In a case where the average value of reception SNR values within the fixed period of time that have been stored in the history storage unit 209 falls within the changeover-inhibit area, the transmission method is not changed over and the currently prevailing transmission method is maintained.

When the average value of the reception SNR values is greater than the maximum value SNR4 of the changeover-inhibit area, the transmission method is changed over to the non-STBC scheme. When the average value of the reception SNR values is smaller than the minimum value SNR3 of the changeover-inhibit area, it is determined that the communication environment is poor and therefore the transmission method is changed over to the STBC scheme.

Figure 4B:
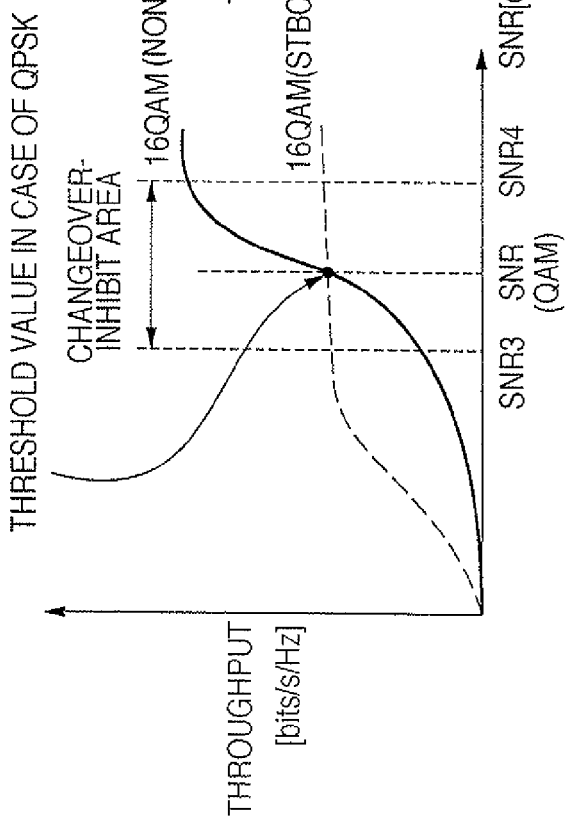

The changeover-inhibit area W changes constantly in accordance with environmental fluctuation during communication, i.e., range of fluctuation of the reception SNR values that have been stored in the history storage unit 209, and the values of SNR3, SNR4 also change in accordance with this range. FIG. 4A represents a case where the fluctuation in reception SNR is large, and FIG. 4B represents a case where the fluctuation in reception SNR is small.

Figure 8:
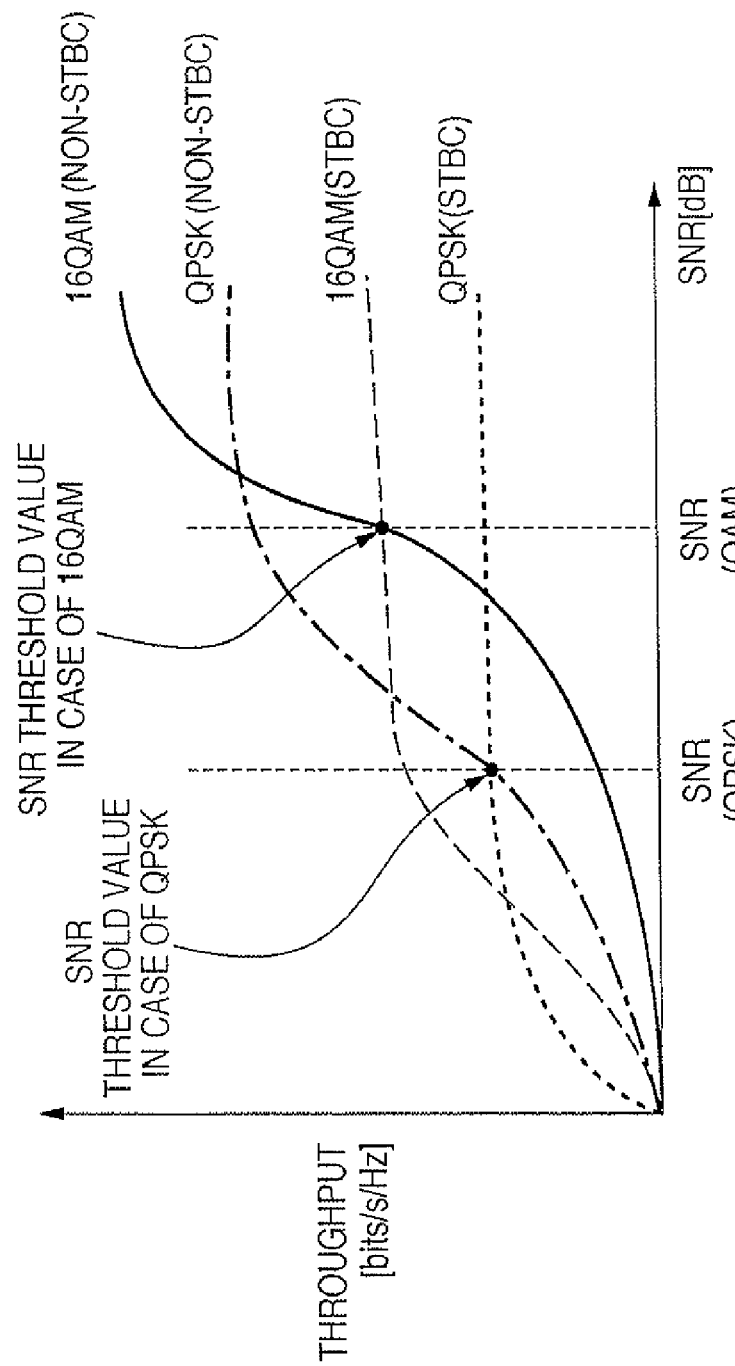
FIG. 8 is a diagram illustrating the relationship between reception SNR and throughput using transmission methods in cases where the respective modulation formats are QPSK and 16QAM.

FIG. 8 illustrates the relationship between reception SNR and throughput using two transmission methods in cases where the respective modulation formats are QPSK and 16QAM.

FIG. 8 illustrates that the threshold value at which throughput reverses differs depending upon the modulation format in the two transmission methods. Specifically, the threshold value SNR(QAM) in the case where the modulation scheme is 16QAM is larger than the threshold value SNR(QPSK) in the case where the modulation scheme is QPSK. The more the modulation format is multivalued, the larger the threshold value becomes. In other words, FIG. 8 indicates that the more the modulation format is multivalued, the more high-speed transmission cannot be performed using the non-STBC scheme unless the communication quality is good.

Figure 1:
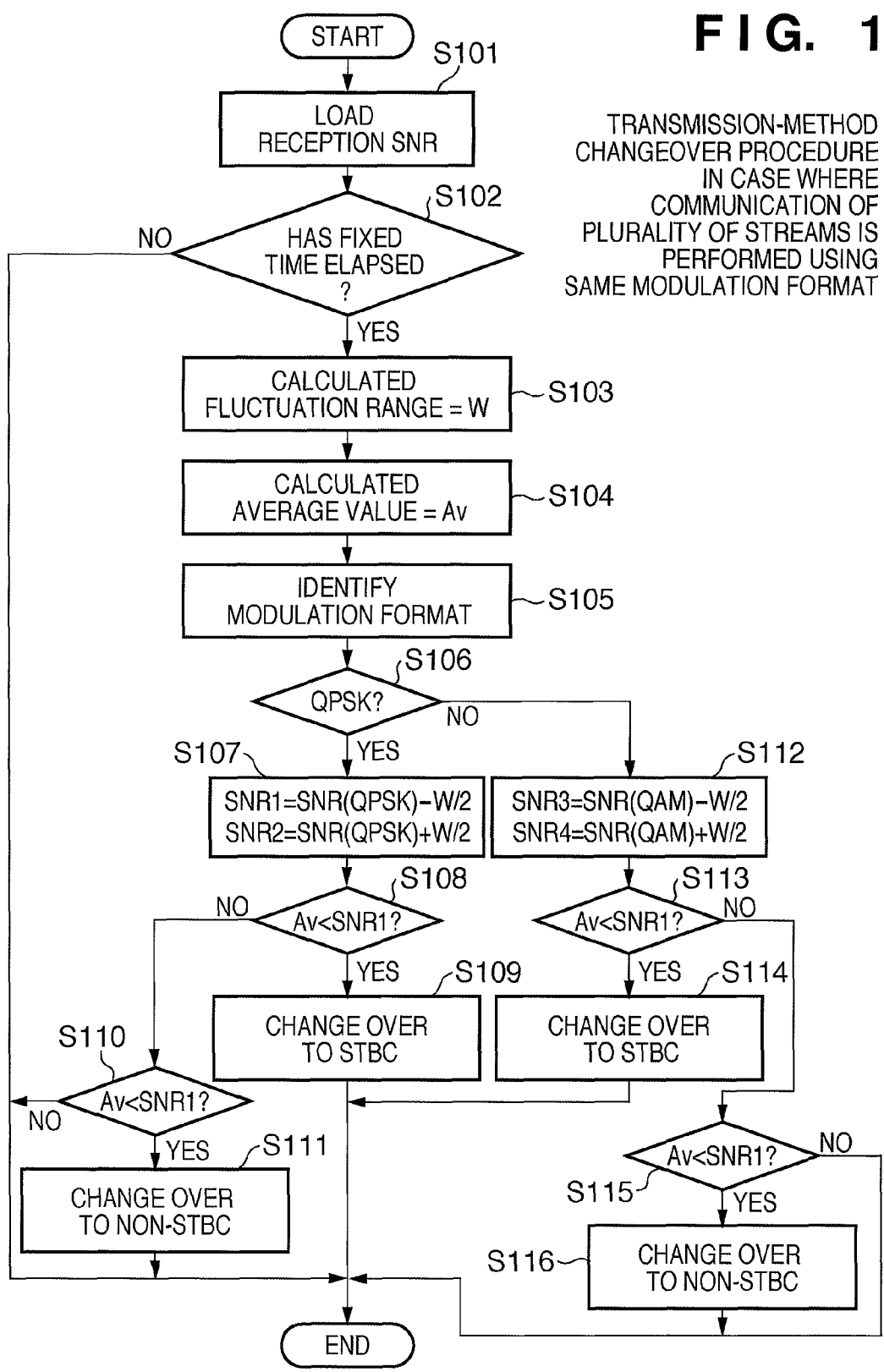
FIG. 1 is a flowchart illustrating a changeover procedure in a case where communication of a plurality of streams is performed using the same modulation format in an embodiment.

FIG. 1 is a flowchart illustrating a transmission-method changeover procedure in a case where communication of a plurality of streams is performed using the same modulation format.

At step S101, the reception SNR value is loaded and stored in the history storage unit 209 of controller 200. Next, at step S102, it is determined whether a fixed period of time has elapsed. If the fixed period of time has elapsed, control proceeds to step S103, the range of fluctuation of past reception SNR values is calculated and this is adopted as W. Next, at step S104, the average value of past reception SNR values is calculated and this is made Av.

Next, at step S105, the modulation format prevailing during communication at the present time is identified. If it is determined at step S106 that the modulation format is QPSK, the minimum and maximum values SNR1, SNR2, respectively, of the transmission-method changeover-inhibit area are calculated at step S107. The minimum value SNR1 is found from SNR1=SNR(QPSK)−W/2, and the maximum value SNR2 is found from SNR2=SNR(QPSK)+W/2. Here the threshold value SNR(QPSK) in the case where the modulation format is QPSK employs a value in the table stored in the threshold-value storage unit 210.

Next, at step S108, the comparator 212 compares the average value Av of reception SNR calculated at step S104 with SNR1, which is the minimum SNR value of the changeover-inhibit area calculated at step S107. If the average value Av is smaller than SNR1, then the transmission method/modulation format decision unit 213 selects the STBC scheme as the transmission method at step S109 and transmits request information requesting changeover to the STBC scheme. If it is found at step S108 that Av is equal to or greater than SNR1, then control proceeds to step S110. Here the comparator 212 compares Av and the maximum value SNR2 of the changeover-inhibit area. If Av is greater than SNR2, then control proceeds to step S111, the transmission method/modulation format decision unit 213 selects the non-STBC scheme as the transmission method and transmits request information requesting changeover to the non-STBC scheme. If it is found at step S110 that Av is equal to or less than SNR2, then the transmission method is not changed over and is left as is. That is, since the value of Av at this time is a value in the changeover-inhibit area, no changeover of the transmission method is carried out.

If it is determined at step S106 that the modulation scheme is 16QAM, then the minimum and maximum values SNR3, SNR4, respectively, of the transmission-method changeover-inhibit area are calculated at step S112. The minimum value SNR3 is found from SNR3=SNR(QAM)−W/2, and the maximum value SNR4 is found from SNR4=SNR(QAM)+W/2. Here the threshold value SNR(QAM) in the case where the modulation format is QAM employs a value in the table stored in the threshold-value storage unit 210.

Next, at step S113, the comparator 212 compares the average value Av of reception SNR calculated at step S104 with SNR3, which is the minimum SNR value of the changeover-inhibit area calculated at step S112. If the average value Av is smaller than SNR3, then the transmission method/modulation format decision unit 213 selects the STBC scheme as the transmission method at step S114 and transmits request information requesting changeover to the STBC scheme. If it is found at step S113 that Av is equal to or greater than SNR3, then control proceeds to step S115. Here the comparator 212 compares Av and the maximum value SNR4 of the changeover-inhibit area. If Av is greater than SNR4, then control proceeds to step S116, the transmission method/modulation format decision unit 213 selects the non-STBC scheme as the transmission method and transmits request information requesting changeover to the non-STBC scheme. If it is found at step S115 that Av is equal to or less than SNR4, then the transmission method is not changed over and is left as is. That is, since the value of Av at this time is a value in the changeover-inhibit area, no changeover of the transmission method is carried out.

Figure 7:
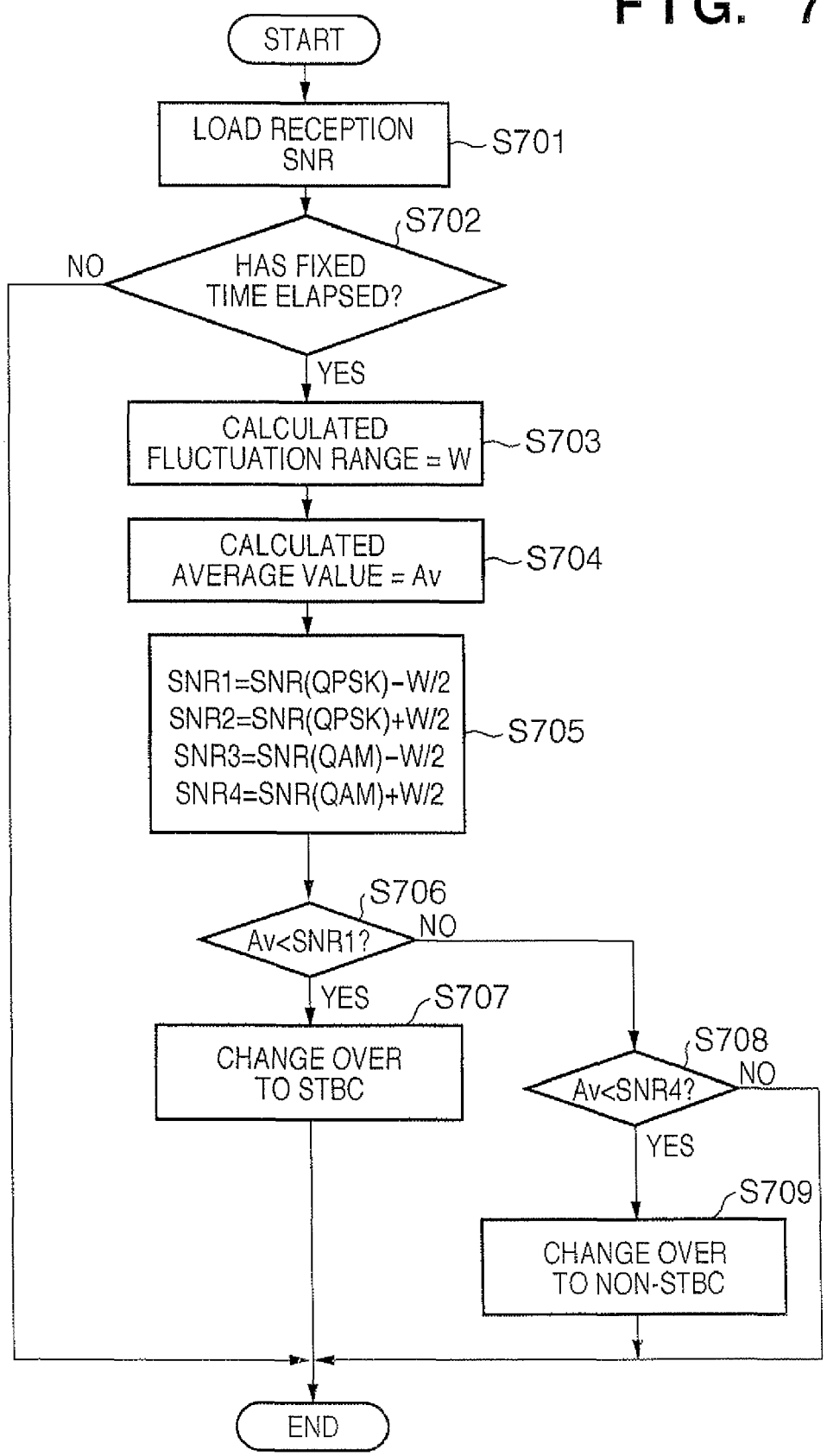
FIG. 7 is a flowchart illustrating a transmission-method changeover procedure in a case where communication of a plurality of streams is performed using different modulation formats.

FIG. 7 is a flowchart illustrating a transmission-method changeover procedure in a case where communication of a plurality of streams is performed using different modulation formats.

At step S701, the reception SNR value is loaded and stored in the history storage unit 209 of controller 200. Next, at step S702, it is determined whether a fixed period of time has elapsed. If the fixed period of time has elapsed, control proceeds to step S703, the range of fluctuation of past reception SNR values is calculated and this is adopted as W. Next, at step S704, the average value of past reception SNR values is calculated and this is made Av.

Next, at step S705, the minimum values SNR1, SNR3 and maximum values SNR2, SNR4 of the transmission-method changeover-inhibit areas in each of the modulation schemes are calculated. The minimum value SNR1 in the case of a stream the modulation scheme of which is QPSK serving as the first modulation scheme is found from SNR1=SNR(QPSK)−W/2, and the maximum value SNR2 in this case is found from SNR2=SNR(QPSK)+W/2. As a result, a first zone for which the minimum value is SNR1 and the maximum value is SNR2 is found. Further, the minimum value SNR3 in the case of a stream the modulation scheme of which is 16QAM serving as the second modulation scheme is found from SNR3=SNR(QAM)−−W/2, and the maximum value SNR4 in this case is found from SNR4=SNR(QAM)+W/2. As a result, a second zone for which the minimum value is SNR3 and the maximum value is SNR4 is found. Here the threshold values SNR(QPSK), SNR(16QAM) of each of the modulation schemes use values in the table that has been stored in the threshold-value storage unit 210.

Next, at step S706, the comparator 212 compares the average value Av of reception SNR calculated at step S704 with SNR1, which is the minimum SNR value of the changeover-inhibit area, calculated at step S705, in the case where the modulation scheme is QPSK. If the average value Av is smaller than SNR1, then the transmission method/modulation format decision unit 213 selects the STBC scheme as the transmission method at step S707 and transmits request information requesting changeover to the STBC scheme. If it is found at step S706 that Av is equal to or greater than SNR1, then control proceeds to step S708. Here the comparator 212 compares Av and the maximum value SNR4 of the changeover-inhibit area in the case where the modulation scheme is 16QAM. If Av is greater than SNR4, then control proceeds to step S709, the transmission method/modulation format decision unit 213 selects the non-STBC scheme as the transmission method and transmits request information requesting changeover to the non-STBC scheme. If it is found at step S708 that Av is equal to or less than SNR4, then the transmission method is not changed over and is left as is.

(Other Embodiments)

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-095431, filed Apr. 1, 2008, which is hereby incorporated by reference herein in its entirety.

What is claimed is:

1. A wireless communication apparatus comprising:
    a detection unit configured to detect reception quality of a signal;
    a changeover unit configured to change over, in accordance with the detected reception quality, a transmission scheme between (i) an STBC (Space-Time Block Coding) transmission scheme for coding an information signal in a spatial direction and transmitting the same information signal from a plurality of antennas, and (ii) a non-STBC transmission scheme for transmitting independent information signals from respective ones of a plurality of antennas; and
    a control unit configured to perform control for changing a threshold value, which is used for changing over the transmission scheme, in accordance with a fluctuation in the reception quality.

2. The apparatus according to claim 1, wherein the changeover unit changes over the transmission scheme to the STBC transmission scheme when the reception quality is smaller than a first threshold value controlled by the control unit, and changes over the transmission scheme to the non-STBC transmission scheme when the reception quality is larger than a second threshold value controlled by the control unit.

3. The apparatus according to claim 1, further comprising an identification unit configured to identify a modulation scheme,
    wherein the control unit performs control for changing the threshold value based upon a value that conforms to the modulation scheme.

4. The apparatus according to claim 3, wherein the control unit performs control for changing a first threshold value based upon a value that conforms to a first modulation scheme, and performs control for changing a second threshold value based upon a value that conforms to a second modulation scheme.

5. A method of controlling a wireless communication apparatus, the method comprising the steps of:
    detecting reception quality of a signal;
    changing over, in accordance with the detected reception quality, a transmission scheme between (i) an STBC (Space-Time Block Coding) transmission scheme for coding an information signal in a spatial direction and transmitting the same information signal from a plurality of antennas, and (ii) a non-STBC transmission scheme for transmitting independent information signals from respective ones of a plurality of antennas; and
    performing control for changing a threshold value, which is used for changing over the transmission scheme, in accordance with a fluctuation in the reception quality.

6. A non-transitory computer-readable storage medium on which is stored a computer-executable program that when executed by a computer implements the wireless communication method set forth in claim 5.

* * * * *